(12) United States Patent
Davidson

(10) Patent No.: US 7,857,010 B1
(45) Date of Patent: Dec. 28, 2010

(54) LOW PERMEABILITY HOSE SYSTEM

(75) Inventor: Howard L. Davidson, San Carlos, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 1040 days.

(21) Appl. No.: 11/615,599

(22) Filed: Dec. 22, 2006

(51) Int. Cl.
*F16L 11/00* (2006.01)

(52) U.S. Cl. ............... 138/137; 138/140; 138/141; 138/DIG. 10; 138/133

(58) Field of Classification Search .......... 138/137, 138/140, 141, 124–127, 129, 132–134, 138, 138/149, DIG. 10
See application file for complete search history.

(56) References Cited

U.S. PATENT DOCUMENTS

| | | | | |
|---|---|---|---|---|
| 4,510,974 A | * | 4/1985 | Natori et al. | 138/137 |
| 4,593,853 A | * | 6/1986 | Schad et al. | 237/56 |
| 5,488,975 A | * | 2/1996 | Chiles et al. | 138/125 |
| 6,213,155 B1 | * | 4/2001 | Furuta et al. | 138/123 |
| 6,213,156 B1 | * | 4/2001 | Niki et al. | 138/126 |
| 6,237,641 B1 | * | 5/2001 | Niki et al. | 138/126 |
| 6,648,023 B2 | * | 11/2003 | Nakakita et al. | 138/127 |
| 6,945,279 B2 | * | 9/2005 | Baba et al. | 138/137 |
| 6,988,515 B2 | * | 1/2006 | Oishi et al. | 138/143 |
| 7,055,553 B2 | * | 6/2006 | Bessette et al. | 138/141 |

* cited by examiner

*Primary Examiner*—Patrick F Brinson
(74) *Attorney, Agent, or Firm*—Michael S. Neustel

(57) ABSTRACT

A low permeability hose system for providing an impermeable length of tube to transfer fluids that is flexible. The low permeability hose system generally includes a hose defining a fluid passage and an impermeable layer attached to the exterior surface of the hose. The impermeable layer is comprised of an aluminum coated heat sealable film that is impermeable to both liquids and gases. A protective layer may be attached to the impermeable layer to protect the impermeable layer from damage.

17 Claims, 5 Drawing Sheets

LOW PERMEABILITY HOSE SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to fluid transfer tubes and more specifically it relates to a flexible low permeability hose for providing an impermeable length of tube to transfer fluids that is flexible.

2. Description of the Related Art

Any discussion of the prior art throughout the specification should in no way be considered as an admission that such prior art is widely known or forms part of common general knowledge in the field.

Single layer hose and multi-layered hose (e.g. hydraulic hose) have been in use for years. The main purpose of multi-layered hose is typically to provide a flexible interior material (e.g. rubber) surrounded by a protective exterior material for abrasion resistance (e.g. multiple layers of woven wire and rubber).

Hoses are used to transport various types of fluids (e.g. liquid coolant, vaporized coolant, combination of liquid and vaporized coolant) from one location to another location. For example, in a spray cooling liquid thermal management system hose may be utilized to transport liquid coolant from and to a spray module or other devices within the spray cooling liquid thermal management system.

Single-phase liquid thermal management systems (e.g. liquid cold plates) and two-phase liquid thermal management systems (e.g. spray cooling, pool boiling, flow boiling, jet impingement cooling, falling-film cooling, parallel forced convection, curved channel cooling and capillary pumped loops) have been in use for years for thermally managing various types of heat producing devices. Spray cooling technology is being adopted today as the most efficient option for thermally managing electronic systems. U.S. Pat. No. 5,220,804 entitled High Heat Flux Evaporative Spray Cooling to Tilton et al. describes the earlier versions of spray technology, as it relates to cooling electronics. U.S. Pat. No. 6,108,201 entitled Fluid Control Apparatus and Method for Spray Cooling to Tilton et al. also describes the usage of spray technology to cool a printed circuit board.

The problem with conventional hose technology, particularly for liquid thermal management systems, is that the hose often times results in a percentage of the coolant (e.g. perfluorocarbon fluids) permeating through the hose resulting in a loss of the coolant. Another problem is that external air and moisture are able to permeate the coolant being transferred within the hose thereby contaminating the coolant. Hose networks comprised of a material that has low permeability (e.g. ethyl vinyl alcohol copolymer, a.k.a. EVOH) is usually relatively rigid, stiff and difficult to utilize when the hosing is implemented in thickness designed for typical system operating pressures (e.g. 20-100 psi) thereby making it impractical as a flexible hose.

Hence, there is a need for a hose that is flexible, resistant to various types of coolants, and impermeable to various types of coolants, gases and other substances.

BRIEF SUMMARY OF THE INVENTION

The general purpose of the present invention is to provide a low permeability hose system that has many of the advantages of the fluid transfer hoses mentioned heretofore. The invention generally relates to a fluid transfer hose which includes a hose defining a fluid passage and an impermeable layer attached to the exterior surface of the hose. The impermeable layer is comprised of an aluminum coated heat sealable film that is impermeable to both liquids and gases. A protective layer may be attached to the impermeable layer to protect the impermeable layer from damage.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a low permeability hose system for providing an impermeable length of tube to transfer fluids that is flexible.

A further object is to provide a low permeability hose system that is both flexible and impermeable to fluids such as but not limited to air, gases, liquids and the like.

Another object is to provide a low permeability hose system that may be utilized to transfer various types of fluids including but not limited to perfluorocarbon fluids (e.g. FLOURINERT manufactured by 3M).

An additional object is to provide a low permeability hose system that may be utilized in various types of fluid transfer systems such as but not limited to single phase liquid thermal management systems and multi-phase liquid thermal management systems.

Another object is to provide a low permeability hose system that prevents the external air from permeating into the fluid being transferred.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
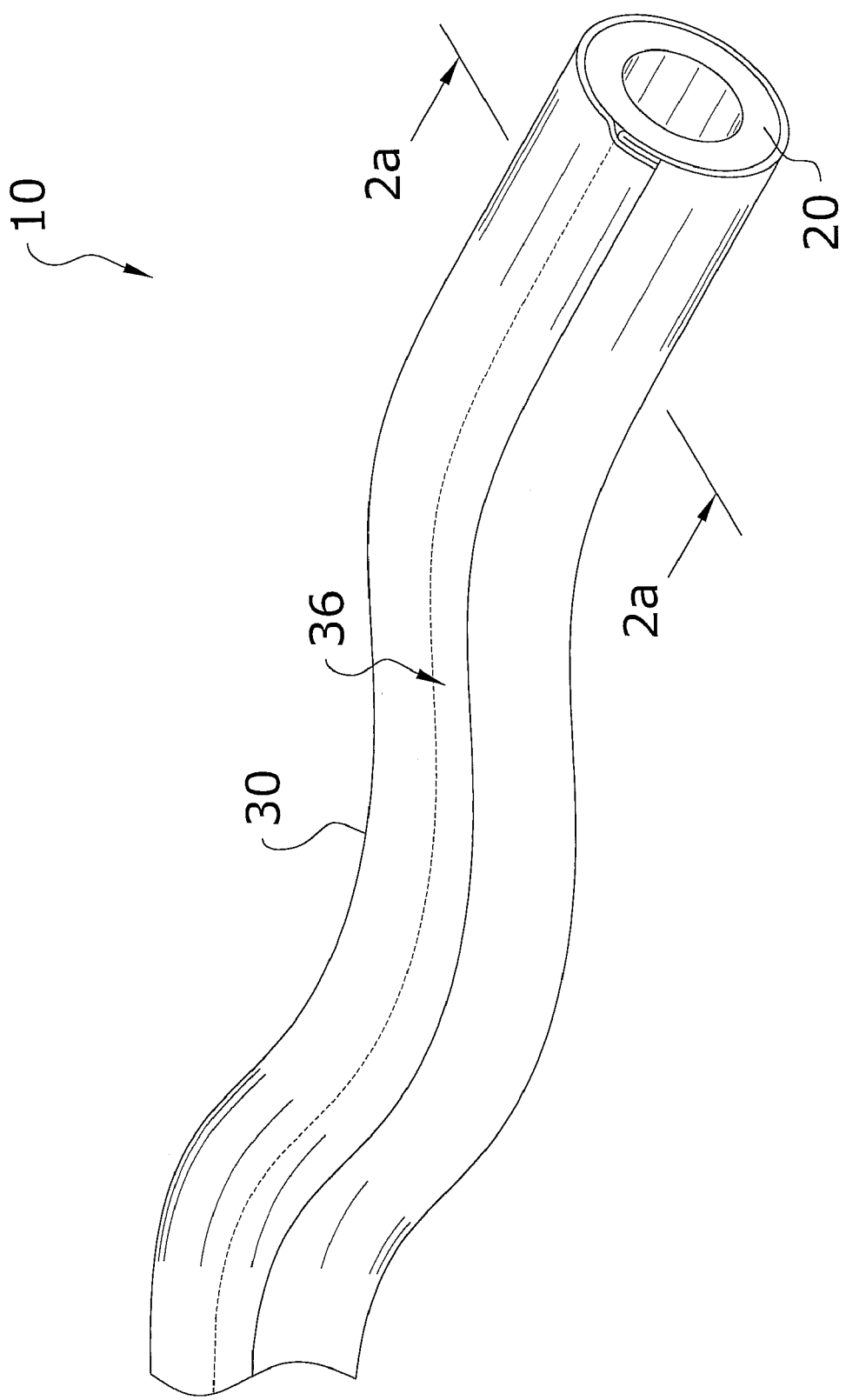
FIG. 1 is an upper perspective view of a preferred embodiment of the present invention.

Turning now descriptively to the drawings, in which similar reference characters denote similar elements throughout the several views, FIGS. 1 through 6 illustrate a low permeability hose system 10, which comprises a hose 20 defining a fluid passage 22 and an impermeable layer 30 attached to the exterior surface 24 of the hose 20. The impermeable layer 30 is comprised of an aluminum coated heat sealable film that is impermeable to both liquids and gases. A protective layer 40 may be attached to the impermeable layer 30 to protect the impermeable layer 30 from damage.

B. Hose

The hose 20 has an exterior surface 24 and an interior surface defining a fluid passage 22. The thickness of the hose 20 may vary depending upon the technical requirements (e.g. strength, flexibility, material type, durability). The fluid passage 22 is capable of transporting both liquids (liquid coolant) and/or gases (e.g. vaporized coolant). The hose 20 and the fluid passage 22 may have various cross sectional shapes and may have various sizes capable of transferring a desired flowrate of coolant.

The hose 20 is comprised of at least one layer and may be comprised of multiple layers of the same or differing materials. The multiple layers may be co-extruded together forming a unitary structure or connected to one another utilizing various adhesives.

The hose 20 is preferably comprised of a flexible material that is compatible with a coolant utilized to thermally manage electronic devices such as but not limited to a perfluorocarbon fluid (e.g. FLOURINERT manufactured by 3M). The hose 20 is preferably comprised of a polyethylene material because of its desired fluid compatibility properties. It is further preferable that the first layer is comprised of an ethylene-octene copolymer.

C. Impermeable Layer

Figure 2A:
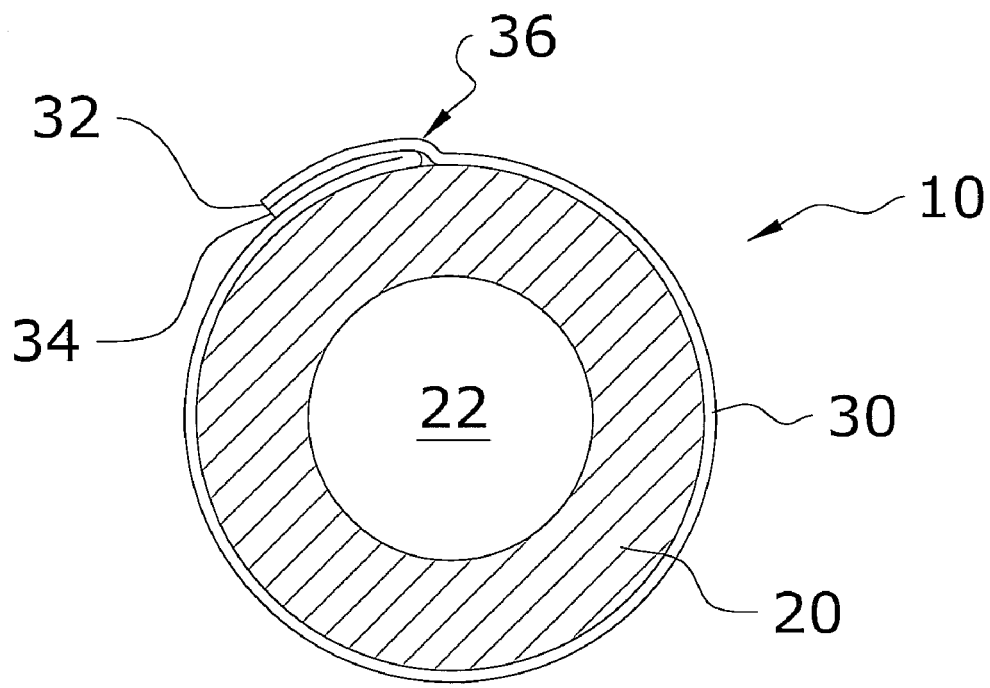
FIG. 2a is a cross sectional view taken along line 2-2 of FIG. 1.
Figure 2B:
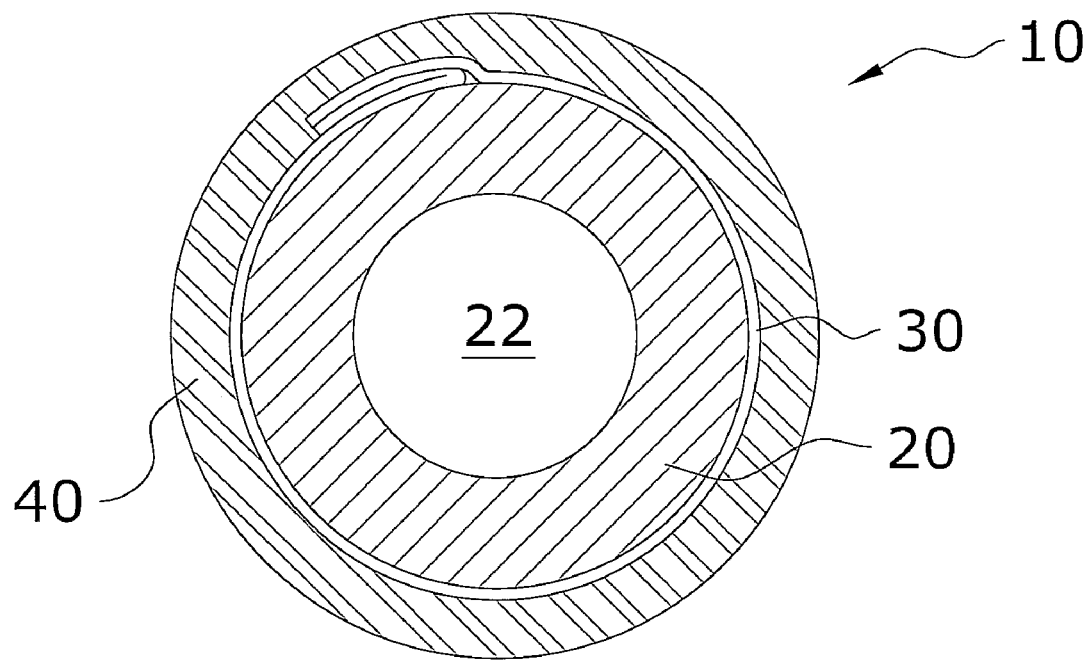
FIG. 2b is a cross sectional view of an alternative embodiment of the present invention illustrating a protective layer attached to the impermeable layer.
Figure 3:
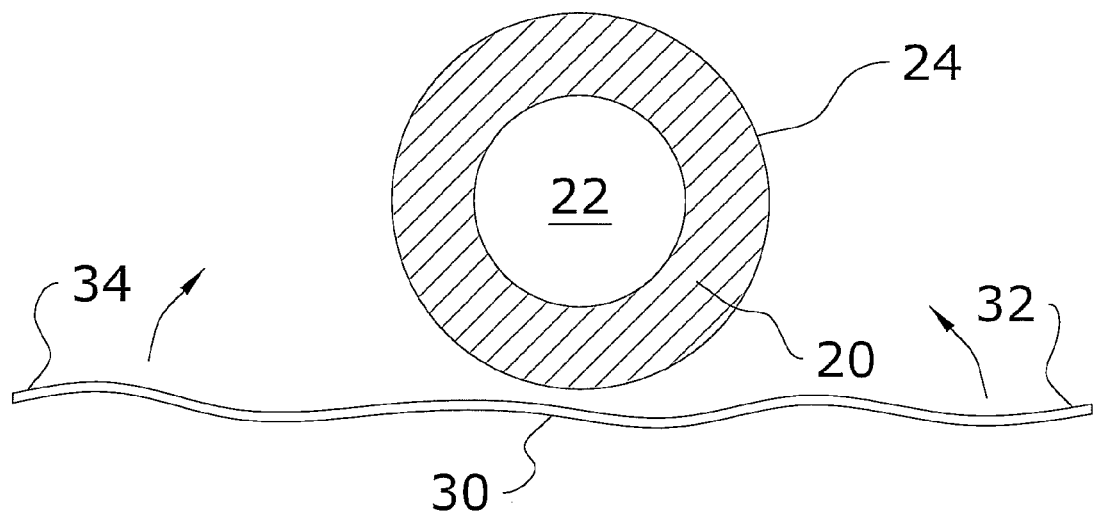
FIG. 3 is a cutaway view of the hose and an impermeable layer to be attached to the hose.

The impermeable layer 30 attached to said exterior surface 24 of said hose 20 as illustrated in FIGS. 1, 2a and 2b of the drawings. The impermeable layer 30 prevents the escape of liquids and gases being transferred within the hose 20. The impermeable layer 30 further prevents the entry of liquids and gases into the hose 20. The impermeable layer 30 preferably completely surrounds said hose 20 in a sealed manner to prevent the escape (e.g. permeation) of liquids and gases from the hose 20.

The impermeable layer 30 is preferably comprised of a heat sealable film. The heat sealable film is heat formed upon the hose 20 whereby the heat sealable film is contracted firmly adjacent to the exterior surface 24 of the hose 20 as shown in FIG. 2a of the drawings. The impermeable layer 30 may alternatively be attached to the hose 20 by an adhesive.

The impermeable layer 30 is preferably comprised of an aluminized film that is impermeable to both liquids and gases. The aluminized film is preferably comprised of a first layer of polyethylene, a second layer of polyester attached to the first layer, a third layer of aluminum attached to the second layer and a fourth layer of polyethylene attached to the third layer.

Figure 5:
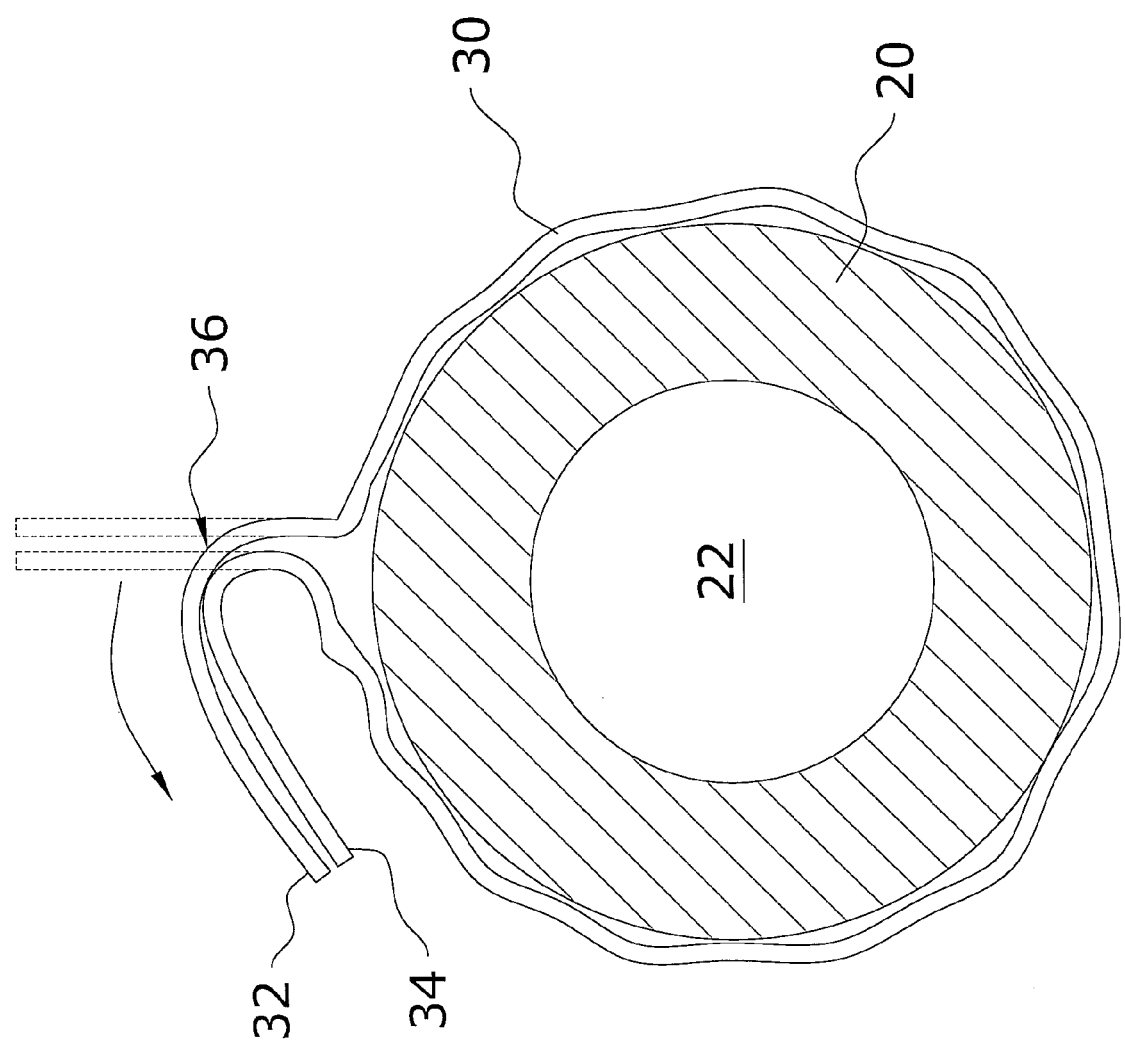
FIG. 5 is a cutaway view of the hose and the tab structure being folded.

The impermeable layer 30 has a first end 32 and a second end 34 that are preferably heat sealed together prior to folding such as with a heated pinch roller set. The first end 32 and the second end 34 may be attached to one another via other attachment systems or not attached at all. The heat sealing may be performed by any conventional heat sealing process. The first end 32 and the second end 34 are then folded forming a folded portion 36 as illustrated in FIGS. 2a and 5 of the drawings.

Figure 4:
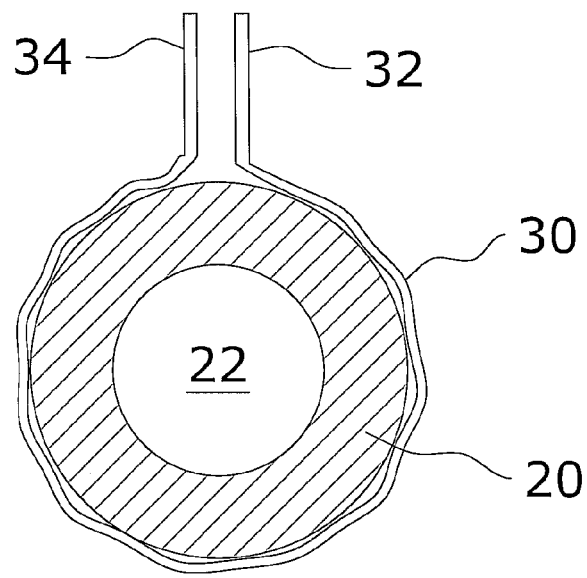
FIG. 4 is a cutaway view of the hose partially surrounded by the impermeable layer with the first end and the second end of the impermeable layer forming a tab structure.

There are commercial machines available that wrap film over tubing or other mandrels in a roll to roll process. Typically, a series of contoured rollers form the film around the mandrel with an extended tab portion as shown in FIG. 4 of the drawings. When the extended tab portion is formed comprised of the first end 32 and the second end 34, the extended tab portion may be welded together with a pair of heat pinch rollers or the like.

D. Protective Layer

FIG. 2b illustrates an alternative embodiment where a protective layer 40 is attached to the impermeable layer 30. The protective layer 40 protects the impermeable layer 30 from damage and may be comprised of various materials capable of protecting the impermeable layer 30 without significantly interfering with the flexibility of the entire product.

E. Liquid Thermal Management System

Figure 6:
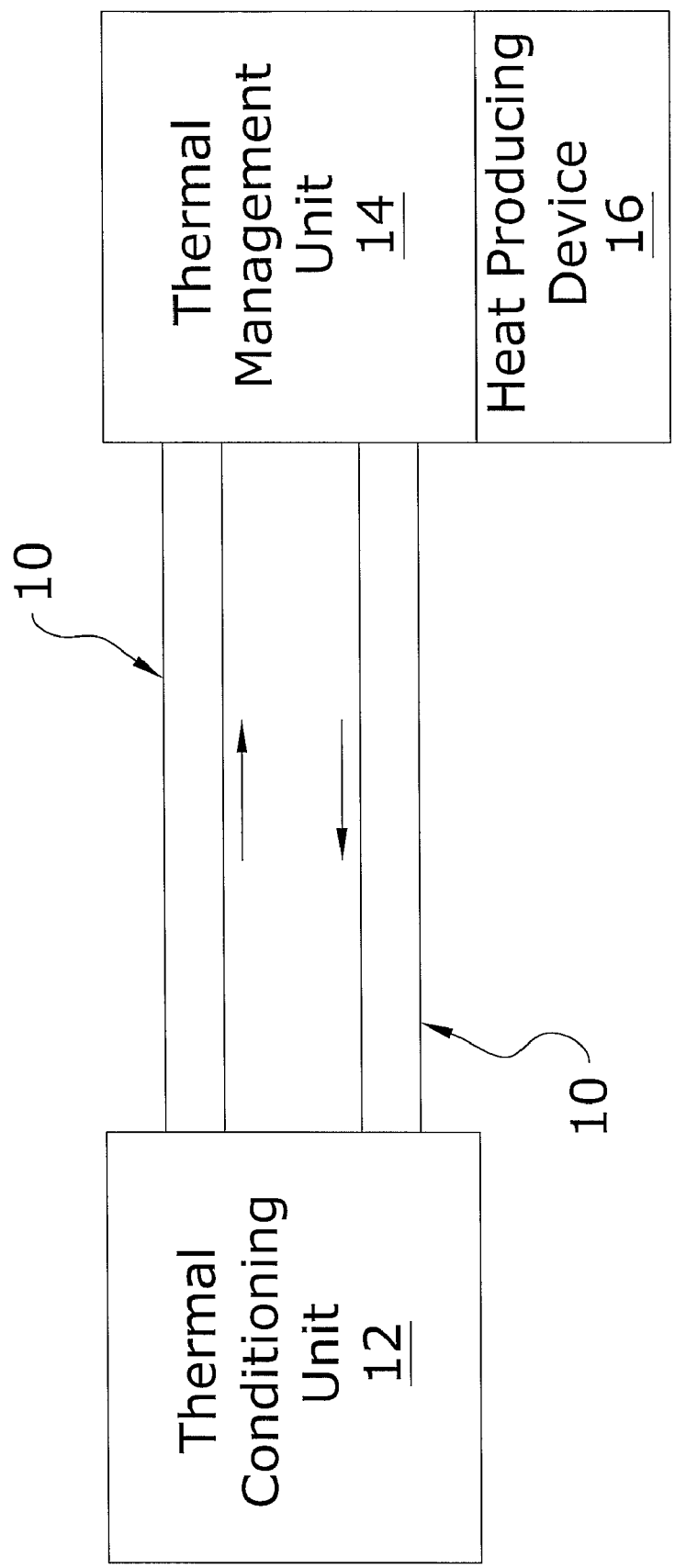
FIG. 6 is a block diagram of the low permeability hose being utilized to fluidly connect a thermal conditioning unit to a thermal management unit.

FIG. 6 illustrates the exemplary usage of the low permeability hose 20 system 10 within a liquid thermal management system for thermally managing a heat producing device 16 (e.g. microprocessor, electronic device). A thermal management unit 14 is fluidly connected to the low permeability hose 20 system 10 as shown in FIG. 6 of the drawings. The thermal management unit 14 is in thermal communication with the heat producing device 16 to thermally manage the heat producing device 16.

The thermal management unit 14 may be comprised of a single-phase liquid thermal management system (e.g. liquid cold plates) or a multi-phase liquid thermal management system (e.g. spray cooling, pool boiling, flow boiling, jet impingement cooling, falling-film cooling, parallel forced convection, curved channel cooling and capillary pumped loops). Spray cooling technology is the preferred liquid thermal management system for use in the present invention. U.S. Pat. No. 5,220,804 entitled High Heat Flux Evaporative Spray Cooling to Tilton et al. and U.S. Pat. No. 6,108,201 entitled Fluid Control Apparatus and Method for Spray Cooling to Tilton et al. are hereby incorporated by reference herein.

A thermal conditioning unit 12 is fluidly connected to the low permeability hose 20 system 10 as further shown in FIG. 6 of the drawings. The thermal conditioning unit 12 thermally conditions the heated exhaust coolant received from the thermal management unit 14 to lower the temperature and return the coolant back to the thermal management unit 14 for thermally managing the heat producing device 16. FIG. 6 illustrates the usage of two low permeability hoses 10 where one is a coolant supply line and a second is a coolant return line. The thermal conditioning unit 12 may include a heat exchanger, a pump, a filter and various other devices commonly utilized to thermally condition coolant.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A low permeability hose, comprising:
   a hose having an exterior surface and an interior surface defining a fluid passage, wherein said hose is comprised of at least one layer; and
   an impermeable layer attached to said exterior surface of said hose, wherein said impermeable layer has a first end and a second end adjacent to one another and wherein said first end and said second end are folded forming a folded portion after sealing;
   wherein said impermeable layer is comprised of an aluminized film that is impermeable to both liquids and gases.

2. The low permeability hose of claim 1, wherein said first end and said second end are attached together.

3. The low permeability hose of claim 1, wherein said first end and said second end are heat sealed together.

4. The low permeability hose of claim 1, wherein said impermeable layer completely surrounds said hose.

5. The low permeability hose of claim 1, wherein said impermeable layer is comprised of a heat sealable film.

6. The low permeability hose of claim 5, wherein said heat sealable film is heat formed upon said hose whereby said heat sealable film is contracted firmly adjacent to said exterior surface of said hose.

7. The low permeability hose of claim 1, wherein said impermeable layer is attached to said hose by an adhesive.

8. The low permeability hose of claim 1, wherein said impermeable layer is comprised of:
   a first layer of polyethylene;
   a second layer of polyester attached to said first layer;
   a third layer of aluminum attached to said second layer; and
   a fourth layer of polyethylene attached to said third layer.

9. The low permeability hose of claim 1, including a protective layer attached to said impermeable layer to protect said impermeable layer from damage.

10. A low permeability hose, comprising:
    a hose having an exterior surface and an interior surface defining a fluid passage, wherein said hose is comprised of at least one layer;
    an impermeable layer attached to said exterior surface of said hose, wherein said impermeable layer is impermeable to both liquids and gases;
    wherein said impermeable layer is comprised of a first layer of polyethylene, a second layer of polyester attached to said first layer, a third layer of aluminum attached to said second layer, and a fourth layer of polyethylene attached to said third layer; and
    a protective layer attached to said impermeable layer to protect said impermeable layer from damage.

11. The low permeability hose of claim 10, wherein said impermeable layer has a first end and a second end adjacent to one another.

12. The low permeability hose of claim 11, wherein said first end and said second end are attached together.

13. The low permeability hose of claim 11, wherein said first end and said second end are heat sealed together.

14. The low permeability hose of claim 11, wherein said first end and said second end are folded forming a folded portion after sealing.

15. The low permeability hose of claim 10, wherein said impermeable layer completely surrounds said hose.

16. A low permeability hose, comprising:
    a hose having an exterior surface and an interior surface defining a fluid passage, wherein said hose is comprised of at least one layer; and
    an impermeable layer attached to said exterior surface of said hose;
    wherein said impermeable layer is comprised of an aluminized film that is impermeable to both liquids and gases;
    wherein said impermeable layer is comprised of a heat sealable film;
    wherein said impermeable layer is comprised of a first layer of polyethylene, a second layer of polyester attached to said first layer, a third layer of aluminum attached to said second layer, and a fourth layer of polyethylene attached to said third layer;
    wherein said heat sealable film is heat formed upon said hose whereby said heat sealable film is contracted firmly adjacent to said exterior surface of said hose.

17. A low permeability hose, comprising:
    a hose having an exterior surface and an interior surface defining a fluid passage, wherein said hose is comprised of at least one layer; and
    an impermeable layer attached to said exterior surface of said hose;
    wherein said impermeable layer is comprised of an aluminized film that is impermeable to both liquids and gases;
    wherein said impermeable layer is comprised of:
    a first layer of polyethylene;
    a second layer of polyester attached to said first layer;
    a third layer of aluminum attached to said second layer; and
    a fourth layer of polyethylene attached to said third layer.

* * * * *